Patented June 14, 1938

2,120,442

UNITED STATES PATENT OFFICE 2,120,442

LAPPING COMPOUNDS

Alexander Lindenberg, Selkirk, Manitoba, Canada

No Drawing. Application June 11, 1937, Serial No. 147,788. In Canada July 27, 1935

5 Claims. (Cl. 51—280)

My invention relates to improvements in lapping compounds, my object being to provide a compound which may be sold in solid or block form for the purpose of imparting a fine finishing edge on tools and the like.

A further object of my invention is to provide a lapping compound in block form which may be applied to the rotating peripheral surface of emery wheels and the like for the purpose of covering the same with a layer of finishing compound.

A further object of my invention is to provide a lapping compound in block form which may be moulded in the form of a disc or wheel upon a suitable cylindrical core.

A further object of my invention is to provide a lapping compound for the finishing of valves and the like, the compound being in plastic form which may be thickened or thinned as required and varied according to the particular work on hand.

A further object of my invention is to provide a lapping compound which will stay on the work being ground and will not work off.

A further object of my invention is to provide a compound for grinding and finishing purposes which is economical to manufacture and use.

With the above more important objects in view and such other minor objects as may appear as the specification proceeds, my invention consists essentially in the combination of ingredients, all as hereinafter more particularly described.

My composition consists in the block form of powdered carbon, manganese dioxide and resin and in the plastic form of powdered carbon, manganese dioxide, resin, cup grease and if necessary for thinning purposes, a quantity of cylinder oil.

In the manufacture in paste form of one pound (16 ounces) of my lapping compound, for instance, I have found the desirable proportions of each of the above ingredients to be as follows:

| | Ounces |
|---|---|
| Powdered carbon | 3.11 |
| Powdered resin | 2.34 |
| Manganese dioxide | 5.46 |
| Cup grease | 2.75 |
| Cylinder oil | 2.34 | although of course the percentage of cylinder oil will vary considerably according to the dilution required and also I may vary the quantities of the above ingredients widely for different purposes.

For instance, in some cases, it will be found desirable to increase considerably the amount of manganese dioxide.

In manufacturing this compound in block form, I take a quantity of resin and raise the same to flash point, thereupon adding my powdered carbon and manganese dioxide which is thoroughly mixed in the heated resin, afterwards allowing the same to cool in a mould, and at this point I would add that I have found that the carbon used in batteries when ground makes a most desirable constituent for my compound as it already contains manganese dioxide.

If desired, I can form the blocks in a circular shallow mould in the centre of which I place a core of equal thickness to the width of the mould and into this I pour my heated materials. When the mould is cool, I have thus provided a lapping wheel with which I am able to impart a very fine edge to tools, skates and other objects requiring a fine edge.

In connection with the moulding of my compound into the solid form, it is necessary to state that the mould should be heated to a point a little below the flash point of the resin just prior to pouring the resin thereinto since if the mould is cold, a shell will form on the edge of the block or disc of compound when it is taken out and this shell may flake off in an unsatisfactory manner.

In connection with the percentages of the ingredients which I use in manufacturing my compound in block form, I would say that I have found the most satisfactory percentages to be as follows in the form of blocks weighing one pound each:

| | Ounces |
|---|---|
| Carbon | 4.57 |
| Manganese dioxide | 8 |
| Resin | 3.43 |

Finally, I would mention in connection with my solid compound that I have found a very desirable way to use the same for finishing the edges of tools, skates and the like consists in rotating an emery wheel and heating the peripheral surface thereof by friction until the same has reached a temperature above the flash point of the compound. I then hold a block of my compound against the rotating periphery and in this way, build up layers of my compound upon the periphery of the stone.

I would again emphasize that I do not wish to be confined to the percentages hereinbefore stated in respect of my compound and since various modifications can be made in the above invention, and many apparently widely different embodiments of same, made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:—

1. A plastic finishing or lapping compound comprising carbon, manganese dioxide, wood-gum resin and a semi-solid binder.

2. A plastic finishing or lapping compound comprising carbon, manganese dioxide, wood-gum resin and a hydrocarbon binder.

3. A plastic finishing or lapping compound comprising approximately 19% by weight of carbon, 34% by weight of manganese dioxide, 15% by weight of powdered wood-gum resin and 32% by weight of a binder.

4. The compound as defined in claim 3 in which said binder consists of cup grease.

5. A solidified finishing or lapping compound comprising 28.56 percent by weight of carbon, 50 percent by weight of manganese dioxide and 21.44 percent by weight of wood-gum resin.

ALEXANDER LINDENBERG.